(12) United States Patent
Kleineberg et al.

(10) Patent No.: US 7,115,697 B2
(45) Date of Patent: Oct. 3, 2006

(54) ADHESIVE FOR HIGH-TEMPERATURE LAMINATE

(75) Inventors: Olaf Kleineberg, Wuppertal (DE); Erik de Jong, Wuppertal (DE); Engin Temeltas, Wuppertal (DE); Heinz-Peter Pfeiffer, Wuppertal (DE); Peter Schreiber, Sprockhoevel (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 231 days.

(21) Appl. No.: 10/930,545

(22) Filed: Aug. 31, 2004

(65) Prior Publication Data

US 2006/0046067 A1    Mar. 2, 2006

(51) Int. Cl.
*C08G 18/10*    (2006.01)
(52) U.S. Cl. ............................. 528/60; 528/83; 528/905
(58) Field of Classification Search .................. 528/60, 528/83, 905
See application file for complete search history.

(56) References Cited

U.S. PATENT DOCUMENTS 6,503,981 B1 *    1/2003    Hellwig et al. ............. 524/589

FOREIGN PATENT DOCUMENTS

WO    WO099/24486    5/1999

* cited by examiner

*Primary Examiner*—Rachel Gorr
(74) *Attorney, Agent, or Firm*—Churrea J. Sebree

(57) ABSTRACT

An adhesive composition comprising a two-component system comprising

A) at least one polyester urethane containing at least two isocyanate groups, which polyester urethane may be obtained by reaction of one or more polyesters 1 with aliphatic diisocyanates and reaction with one or more polyesters 2, wherein polyester 1 exhibits a number average molecular weight Mn in the range from 3,000 to 7,000 g/mol and polyester 2 exhibits a number average molecular weight Mn in the range from 700 to 2,000 g/mol and B) one or more branched polyesters with a number average molecular weight Mn in the range from 1,000 to 3,500 g/mol and optionally one or more conventional additives;

the present invention provides a polyurethane-based adhesive composition which is suitable for the production of laminates for sterilizable packaging and exhibits a low residual content of highly volatile diisocyanates. The adhesive according to the invention ensures that no or only slight delamination of the film composites occurs even at elevated temperatures.

12 Claims, No Drawings

ADHESIVE FOR HIGH-TEMPERATURE LAMINATE

FIELD OF THE INVENTION

The invention is directed to a polyurethane-based laminate adhesive with high heat-sealing properties.

DESCRIPTION OF RELATED ART

Laminate adhesives are used for large-area bonding of individual films to form laminates. The properties of the individual films are combined in such a way that the laminate is suitable for subsequent use as a packaging material. The laminates are used for the packaging of goods, such as, for example, foodstuffs, hygiene articles or items which need protection from damage prior to first usage. Of particular significance is the fact that low molecular weight residues of the laminate adhesive may be transferred from the laminate onto the respective contents. In this respect, isocyanates or amines, or the hydrolysis products thereof, are in particular deemed to be of critical significance. Laminate adhesives consist as a rule of isocyanate group-containing polyurethane binders, which may be chain-extended or crosslinked with appropriate curing agents to yield high molecular weight substances. In such crosslinking reactions, a certain proportion of the diisocyanate component, which is conventionally used in excess, may be present in the reaction mixture at the end of the reaction. As a rule, these diisocyanates are highly volatile and may have a harmful effect on health.

WO 99/24486 describes polyurethane adhesives with which laminates may be produced which exhibit no or only a slight tendency to delaminate at elevated temperature. The adhesives described contain the aromatic isocyanates conventional in polyurethane chemistry, such as, in particular, tolylene diisocyanate and diphenylmethane diisocyanate.

But, for sterilizable packaging, so-called high temperature laminates with particular properties are required. These high temperature laminates are used in the production of flexible foodstuff packaging, in particular if foodstuffs have to be sterilized in the packaging. The sterilization conditions for such packaging and contents have been precisely set by law at temperatures in the range of 135° C. to ensure effective killing of microbes. Sterilization here takes place under pressure in an autoclave. The heat treatment may result in the inner plies of the flexible packaging (e.g. consisting of polyolefin) being heated to the verge of their softening or melting point, such that they may become permeable to small molecules, such as, for example, monomeric isocyanates, which originate from the adhesive layer inside the film composite.

In order to minimise the risk of migration of toxic substances or substances injurious to the health of the consumer, regulations exist to avoid the use of highly volatile components for the production of such laminates to avoid migration and subsequent hydrolysis of such substances forming any carcinogenic amines.

SUMMARY OF THE INVENTION

The present invention provides a polyurethane-based adhesive composition which is suitable for the production of laminates for sterilizable packaging and exhibits a low residual content of highly volatile diisocyanates. The adhesive according to the invention ensures that no or only slight delamination of the film composites occurs even at elevated temperatures.

The adhesive composition according to the invention comprising a two-component system comprising A) at least one polyester urethane containing at least two isocyanate groups, which polyester urethane may be obtained by reaction of one or more polyesters 1 with aliphatic diisocyanates and reaction with one or more polyesters 2, wherein polyester 1 exhibits a number average molecular weight Mn in the range from 3,000 to 7,000 g/mol and polyester 2 exhibits a number average molecular weight Mn in the range from 700 to 2,000 g/mol and B) one or more branched polyesters with a number average molecular weight Mn in the range from 1,000 to 3,500 g/mol and optionally, one or more conventional additives.

DETAILED DESCRIPTION OF THE INVENTION

The features and advantages of the present invention will be more readily understood, by those of ordinary skill in the art, from reading the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about." In this manner, slight variations above and below the stated ranges can be used to achieve substantially the same results as values within the ranges. Also, the disclosure of these ranges is intended as a continuous range including every value between the minimum and maximum values.

All patents, patent applications and publications referred to herein are incorporated by reference in their entirety.

In addition to resins which are unreactive towards isocyanate, such as polyvinyl acetate, polyvinyl chloride or copolymers of ethylenically unsaturated compounds, e.g. in an amount of 0 to 15 wt. %, component A) may contain the additives conventional in polyurethane chemistry, such as, for example, catalysts, accelerators, light stabilizers, extenders, pigments and adhesion promoters in the amounts conventional in coating chemistry, e.g. from 0.5 to 10 wt. %, relative to the adhesive composition.

The polyurethane contained in the adhesive composition according to the invention as component A) may be produced from one or more polyesters with different number average molecular weight Mn.

It is also possible to react a plurality of polyesters 1 and a plurality of polyesters 2 together according to the invention to yield component A).

The polyesters 1 and 2 of component A) may be unbranched and branched polyesters. The usage of branched polyesters makes it possible to control the cross-linking density of the reaction product. The use of unbranched polyesters 1 and 2 are preferred.

The polyesters are hydroxy-functional and exhibit hydroxyl values for example of 15 to 150 mg of KOH/g, together with acid values, for example, in the range from 0 to 6 mg of KOH/g.

The polyurethane of component A) used according to the invention exhibits a number average molecular weight Mn of 3,000 to approximately 15,000, preferably of 4,000 to 8,000 g/mol.

The aliphatic diisocyanates used for the production of component A) are of a low molecular weight with a number average molecular weight Mn of 110 to 300 g/mol. Instead of aliphatic diisocyanates, the trimerization products thereof may also be used, namely aliphatic diisocyanate-based isocyanurates.

Aliphatic diisocyanates are, for example, isophorone diisocyanate (IPDI), or hexamethylene diisocyanate (HDI). Small quantities of aromatic diisocyanate compounds may optionally be present, such as, for example, tolylene diisocyanate (TDI) and others, with contents of below 0.5 wt.-%.

Preferably, no aromatic diisocyanates are used. Preferably, IPDI is used.

The aliphatic diisocyanates may optionally be used in blocked form.

Blocking may proceed with conventional agents, e.g. with ethylene glycol monobutyl ether, butanone oxime, phenol, ethyl acetoacetate, malonic ester, dimethylpyrazole or caprolactam. Preferably, the isocyanate groups of the aliphatic diisocyanates used are free of blocking agents.

Examples of polyesters are products of dicarboxylic acids and/or tricarboxylic acids with diols and/or polyols. Suitable dicarboxylic acids are, for example, adipic acid, sebacic acid, dodecanoic acid and/or derivatives thereof, maleic acid or fumaric acid or aromatic dicarboxylic acids, such as, for example, phthalic acid, isophthalic acid or terephthalic acid.

Suitable tricarboxylic acids are for example citric acid or trimellitic acid.

The dicarboxylic acids and/or tricarboxylic acids may be aliphatic, cycloaliphatic, aromatic or heterocyclic or both. They may also additionally be substituted.

Further examples of polycarboxylic acids are succinic acid, suberic acid, azelaic acid, sebacic acid, tetrachlorophthalic anhydride, glutaric anhydride, dimer fatty acid, trimer fatty acid or mixtures thereof.

Difunctional and/or trifunctional alcohols or polyols which may be used are ethylene glycol, diethylene glycol, neopentyl glycol, hexanediol, butanediol, propylene glycol, glycerol or trimethylolpropane, and also hydroxymethylcyclohexane, 1,2,4-butanetriol, triethylene glycol, polyethylene glycol, dipropylene glycol, polybutylene glycol, pentaerythritol and mixtures thereof.

In addition to the polyesters, proportions of polyethers may also be present, for example, in proportions of 0 to 15 wt.-%, relative to the adhesive composition. These are likewise hydroxy-functional and preferably exhibit a hydroxyl value of 50 to 400 mg of KOH/g.

Examples of polyethers are reaction products of the stated alcohols with ethylene oxide, propylene oxide or butylene oxide or mixtures thereof. Further examples of polyethers are: polyethylene glycol, polypropylene glycol or polytetramethylene glycol as well as polypropylene glycols modified with ethylene oxide or mixtures thereof. Polyethers may, for example, exhibit a number average molecular weight Mn of 400 to 2,000 g/mol. Preferably, no polyethers are used.

The polyesters which may be used according to the invention may be produced in conventional manner by performing an esterification reaction of the acid component with the alcohol component, for example, in a nitrogen atmosphere, for example at temperatures of between 140 and 260° C., with or without use of conventional esterification catalysts.

The polyester 1 is preferably produced from the components selected from the group consisting of adipic acid, isophthalic acid, azelaic acid, ethylene glycol, diethylene glycol and hexanediol-1,6.

The polyester 2 is preferably produced from the components selected from the group consisting of adipic acid, isophthalic acid, terephthalic acid, dimethylterephthalat, azelaic acid, ethylene glycol, diethylene glycol, hexanediol-1,6, propylene glycol.

As component B), at least one branched polyester is used with a number average molecular weight Mn in the range from 1,000 to 3,500 g/mol. The degree of branching is determined by the components used to produce the polyester. These components can be the components already mentioned above which are able to produce branched and hydroxy-functional polyesters, and are for example adipic acid, isophthalic acid, terephthalic acid, sebacic acid, maleic acid, azelaic acid and/or derivatives thereof, such as, phthalic anhydride, maleic anhydride, and e.g. ethylene glycol, diethylene glycol, neopentyl glycol, hexanediol-1,6, propylene glycol, glycerol, trimethylolpropane, pentaerythritol and mixtures thereof.

The polyester of component B) is preferably produced from the components selected from the group consisting of adipic acid, isophthalic acid, ethylene glycol, propylene glycol and trimethylolpropane.

Component A) may be produced by using chain extenders. The chain extenders may comprise the short-chain diols conventionally used for this purpose, such as ethylene glycol, diethylene glycol, triethylene glycol, 1,2- or 1,3-propanediol, 1,2- or 1,4-butanediol, neopentyl glycol, 1,6-hexanediol, dipropylene glycol or tripropylene glycol. Preferably, 1,6-hexanediol is used.

The equivalent ratio by weight of the isocyanate (NCO) groups of the polyester urethane of component A) to the OH groups of the polyester of component B) amounts from 1:0.5 to 1:2, preferably 1:0.9. The mixing ratio of components A) and B) results from the total content of isocyanate groups in component A) and of OH groups in component B).

Production of component A) proceeds by mixing at least one polyester 1 and at least one polyester 2 and aliphatic diisocyanates, optionally, with admixture of conventional additives, in particular adhesion promoters. The constituents of component A) may be heated jointly, for example, in one reaction vessel.

In a preferred embodiment of the invention, component A) is produced, wherein at least one hydroxy (OH)-functional polyester 1 is reacted with IPDI and optionally, further additives, wherein the NCO/OH— ratio amounts from 1:3 to 1:6, and with at least one further OH polyester 2, wherein a polyester urethane is obtained with at least two free isocyanate groups.

Preferably, the OH to NCO ratio in the resultant polyester urethane amounts from 1:2 to 1:4.

Components A) and B) are mixed together directly prior to application onto the substrates to be bonded. Mixing may be performed for example in a static mixer or a mixing tube, as conventionally corresponds to the prior art with regard to the application of two-component adhesives.

The viscosity of a 60%-solution of the finished adhesive composition, dissolved in ethylacetatelies, for example, in a range from 300 to 2,000 mPa·s, particularly preferably, between 400 to 1,500 mPa·s, measured at 25° C.

The adhesive composition according to the invention may be used to stick the most varied materials together. These materials may be, for example, web-form materials of plastics, such as, polyethylene, polypropylene, polyamide, or metal, e.g. metal foils such as aluminium foils, or plastics films, such as metal oxide vapour-deposited or metal vapour-deposited plastics films.

The invention therefore also provides a process for bonding substrates, in particular, for producing laminates, in which the adhesive composition according to the invention is applied onto the surface of at least one of the substrates to be bonded and caused to cure.

The invention also provides use of the adhesive composition of the invention for bonding substrates, in particular, for producing laminates for sterilizable packaging.

With the adhesive composition according to the invention, it is possible to produce laminates with high processing reliability, in particular with regard to heat-sealing. Especially, if foodstuffs have to be sterilized in the packaging, whereby a temperature in the range of 121 to 135° C. is usually used, the sticking of the materials in the laminate is retained respectively increased. This results in a high resistance of the foil laminate. Furthermore, it is ensures that no substances injurious to the health of the consumer are developed or released.

The present invention is further defined in the following Examples. It should be understood that these Examples are given by way of illustration only. From the above discussion and these Examples, one skilled in the art can ascertain the essential characteristics of this invention, and without departing from the spirit and scope thereof, can make various changes and modifications of the invention to adapt it to various uses and conditions. As a result, the present invention is not limited by the illustrative examples set forth herein below, but rather is defined by the claims contained herein below.

The following Examples illustrate the invention. All parts and percentages are on a weight basis unless otherwise indicated.

EXAMPLES

Example 1

Production of Polyesters 1 and 2

Polyester 1:

248 g of ethylene glycol (4 mol), 268 g of diethylene glycol (2.53 mol), 85.2 g of 1,6-hexanediol (0.72 mol), 542 g of azelaic acid (2.88 mol) and 479.3 g of isophthalic acid (2.89 mol) are polycondensed in a 2 l flask fitted with a stirrer, internal thermometer, connections for vacuum and inert gas and distillation apparatus at most 230° C. Once an acid value of 13 has been reached, a vacuum is applied and condensation is performed to an acid value <4 mg of KOH at most 250° C.

| | | |
|---|---|---|
| Hydroxyl value: | 84 | mg of KOH/g |
| Acid value: | 3 | mg of KOH/g |
| Mn: | 1150 | |

Polyester 2:

254 g (4 mol) of ethylene glycol, 354 g (1.8 mol) of hexanediol, 349 g (1.8 mol) of dimethyl terephthalate and 0.6 g of dibutyltin dilaurate are heated in a reaction vessel as described above until methanol evolves. The temperature in the reaction vessel is controlled such that an overhead temperature of 65° C. is not exceeded. Once methanol elimination is complete, 299 g (1.8 mol) of isophthalic acid and 197 g (1.35 mol) of adipic acid are added. Further condensation is then performed at an overhead temperature of at most 101° C. The product temperature is slowly raised to 250° C. Once 250° C. has been reached, a vacuum is applied and condensation proceeds until a 60% sample solution in xylene has a viscosity of 2100 to 2400 mPa·s.

The temperature is then lowered to 180° C. and the mixture is carefully diluted to 63% with 660 g of ethyl acetate.

| | |
|---|---|
| Hydroxyl value: | 23 mg of KOH/g |
| Acid value: | 3 mg of KOH/g |
| Viscosity: | 1380 mPa · s |
| Non-volatile fraction: | 63% |
| Mn: | 5000 |

Example 2

Production of Components A and B

Component A:

389 g of polyester 1 and 120 g (0.3 mol) of propoxylated bisphenol A are dissolved in 1050 g of ethyl acetate in a 2 l flask with fitted with a stirrer, internal thermometer, reflux condenser and inert gas connection. 244 g (1.1 mol) of isophorone diisocyanate, 66 g of Vestanat® T 1890/100 and 0.4 g of dibutyltin dilaurate are added to this mixture at room temperature. The reaction mixture is heated gently to 80° C. and maintained at 80° C. until the NCO value ceases to change.

Then, 650 g of the solution of polyester 2 are added and maintained at 80° C. for 3 hours; then 17 g (0.76 mol) of Dynasylan® AMEO are added. After a further hour, an NCO value of 1.3 to 2.0% is reached.

| | |
|---|---|
| NCO value | 1.81% |
| Viscosity: | 980 mPa · s |
| Non-volatile fraction: | 61% |

Component B:

198 g of ethylene glycol (3.2 mol), 228 g (3 mol) of propylene glycol, 82 g (0.61 mol) of trimethylolpropane, 598 g (3.6 mol) of isophthalic acid and 358 g (2.45 mol) of adipic acid are weighed out into a reaction vessel as used in Example 1. The reaction mixture is polycondensed at an overhead temperature of at most 101° C. and a product temperature of at most 220° C. to an acid value of below 7. A 75% sample solution in ethyl acetate must have a viscosity of 2500 to 3500 mPa·s.

Once the viscosity has been reached, the temperature is reduced to 150° C. and 60 g of EPIKOTE® 1055 are added. When the epoxy resin has fused, it is diluted with 430 g of ethyl acetate.

| | |
|---|---|
| Hydroxyl value: | 65 mg of KOH/g |
| Acid value: | 5.5 mg of KOH/g |
| Non-volatile fraction: | 74.5% |

Example 3

Use of the Adhesive Composition According to the Invention

Chromatized aluminium (thickness of 90 μm) was bonded with polypropylene 273 (thickness 30 μm) under the use of the adhesive composition of Example 2 to give a laminate.

A laminate of the same materials was produced under the use of an adhesive of the prior art based on a linear aromatic polyester with Mn 8,000–15,000.

After a curing time of three days the sterilization of the laminates were carried out in a time of 45 minutes with a temperature of 130° C. and a pressure of 2.2 bar.

The power nessecary for delamination is messured in cN (centi Newton)/15mm, according to the 90° Peel Test. That means a 15 mm wide strip of the laminates were delaminated with the necessary power in cN, see Table 1.

TABLE 1

| Adhesive Composition | | cN/15 mm Before Sterilization | cN/15 mm After Sterilization |
|---|---|---|---|
| 100 wt.-parts of component A cured with wt.-parts of component B | 11 | 850 | 560 |
| | 22 | 960 | 550 |
| | 44 | 930 | 460 |
| Adhesive of the prior art based on a linear aromatic polyester with Mn 8,000–15,000 | | | 10–15 |

The adhesion power of the adhesion composition according to the invention was decreased after sterilization in a small scale, as expected. This corresponds to the requirements of a high heat resistance.

The value of the adhesive of the prior art after sterilization is almost zero and the laminate decomposed.

What is claimed is:

1. An adhesive composition comprising a two-component system comprising
   A) at least one polyester urethane containing at least two isocyanate groups, which polyester urethane being obtained by reaction of one or more polyesters 1 with aliphatic diisocyanates and reaction with one or more polyesters 2, wherein polyester 1 has a number average molecular weight Mn in the range from 3,000 to 7,000 g/mol and polyester 2 has a number average molecular weight Mn in the range from 700 to 2,000 g/mol and
   B) one or more branched polyesters with a number average molecular weight Mn in the range from 1,000 to 3,500 g/mol.

2. The adhesive composition according to claim 1 wherein the polyesters 1 and 2 of component A) and the polyesters of component B) are hydroxy-functional polyesters.

3. The adhesive composition according to claim 1 wherein the equivalent ratio by weight of the isocyanate (NCO) groups of the polyester urethane of component A) to the hydroxy (OH)-functional groups of the polyester of component B) is from 1:0.5 to 1:2.

4. The adhesive composition according to claim 3 wherein the equivalent ratio by weight of the isocyanate (NCO) groups of the polyester urethane of component A) to the hydroxy (OH)-functional groups of the polyester of component B) is from 1:0.9.

5. The adhesive composition according to claim 1 wherein the polyesters 1 and 2 of component A) are unbranched polyesters.

6. The adhesive composition according to claim 1 wherein the OH to NCO ratio in the polyester urethane of component A) is s from 1:2 to 1:4.

7. The adhesive composition according to claim 1 wherein polyester 1 is produced from components selected from the group consisting of adipic acid, isophthalic acid, azelaic acid, ethylene glycol, diethylene glycol and hexanediol-1,6.

8. The adhesive composition according to claim 1 wherein polyester 2 is produced from the components selected from the group consisting of adipic acid, isophthalic acid, terephthalic acid, dimethylterephthalat, azelaic acid, ethylene glycol, diethylene glycol, hexanediol-1,6, propylene glycol.

9. The adhesive composition according to claim 1 wherein the polyester of component B) is produced from the components selected from the group consisting of adipic acid, isophthalic acid, ethylene glycol, propylene glycol and trimethylolpropane.

10. A process for bonding substrates for producing heat-sealing laminates comprising the steps
    a) applying an adhesive composition according to claim 1 onto the surface of at least one of the substrates to be bonded and
    b) curing the composition.

11. A process according to claim 10 wherein the substrates are web-form materials selected from the group consisting of polyethylene, polypropylene, polyamide, metal foils, plastics films, metal oxide vapour-deposited plastics films and metal vapour-deposited plastics films.

12. A bonded substrate for producing a heat-sealing laminate bonded with the adhesive composition of claim 1.

* * * * *